L. A. WATSON.
CAR LIGHTING SYSTEM.
APPLICATION FILED NOV. 27, 1920.
1,401,451.
Patented Dec. 27, 1921.
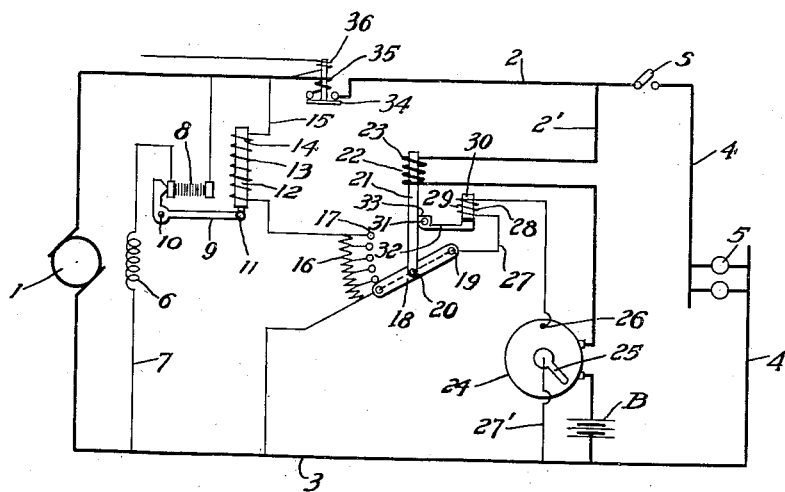
INVENTOR
L. A. Watson
BY
Dull, Warfield & Dull
ATTORNEY

UNITED STATES PATENT OFFICE.

LEONARD A. WATSON, OF SOUND BEACH, CONNECTICUT, ASSIGNOR TO THE SAFETY CAR HEATING AND LIGHTING COMPANY, OF NEW YORK, N. Y., A CORPORATION OF NEW JERSEY.

CAR-LIGHTING SYSTEM.

1,401,451.  Specification of Letters Patent.  Patented Dec. 27, 1921.

Application filed November 27, 1920. Serial No. 426,693.

*To all whom it may concern:*

Be it known that I, LEONARD A. WATSON, a citizen of the United States, residing at Sound Beach, in the county of Fairfield and State of Connecticut, have invented certain new and useful Improvements in Car-Lighting Systems, of which the following is a full, clear and exact description, such as will enable others skilled in the art to which it appertains to make and use the same.

This invention relates to electric distribution systems, and more particularly to systems for lighting railway cars, the energy being supplied from an axle driven generator connected to charge a storage battery or to deliver energy to the lighting system dependent upon service conditions.

It is an object of the invention to provide a system of the class mentioned employing improved means for controlling the generator voltage to compensate for variations in battery condition at the time the same becomes fully charged.

It is a further object to provide a system of the class mentioned employing improved means for regulating the voltage so as to protect the battery from injurious overcharge under variations of battery condition.

Other objects will be in part obvious and in part pointed out hereinafter in connection with the detailed description of an illustrative embodiment shown in the accompanying drawing.

In the simplified diagram of the figure, a generator 1 is connected to be driven at variable speeds from the axle of a railway car. This generator is electrically connected by conductors 2, 2' and 3 with the terminals of a storage battery B suitably carried in any convenient position upon the car. Connected in parallel with conductors 2, 2' are conductors 4, the latter being connected to the terminals of lamps 5 or other electrical transmitting devices. It is obvious also that individual switches may be provided for each lamp or in connection with groups of lamps as desired and a line switch S may be connected in the conductor 4 to control all of the lamps.

The generator is supplied with a field coil 6 connected in a shunt circuit 7 and arranged in series with the field coil is a compression rheostat 8. The compression elements of this rheostat are adapted to be engaged by the short arm of a bell-crank lever 9 suitably pivoted at 10, the other or long arm of said bell-crank lever being suitably connected as at 11 to the movable core 12 of a solenoid 13. This solenoid has a coil 14 connected in a shunt circuit 15 arranged across the main generator circuit and connected in series with coil 14 is a resistance unit 16 having a plurality of contacts 17 tapped off at intervals there along and conveniently arranged in the arc of a circle. A swinging arm 18 pivoted at 19 is arranged to move in contacting relationship over said contacts 17 and is suitably connected at 20 to the core 21 of a solenoid 22. The coil 23 of this solenoid is connected in series with the circuit 2, 2', 3 leading from the generator to the storage battery.

Connected in series with the main battery circuit in conductor 2' is an ampere hour meter 24 having a movable contact arm 25 and a stationary contact block 26, the meter being connected and arranged to operate in a manner well known in the art to indicate the condition of charge or discharge of the storage battery. This meter is preferably supplied with compensating mechanism to compensate for the difference in ampere hours required to charge the battery over the ampere hours delivered by the same.

Connected to the arm 18, which is constructed of conducting material, is a conductor 27 including coil 28 of an electromagnet 29 having a core 30. Pivoted adjacent the solenoid core 21, as at 31, and disposed adjacent magnet 29 is a locking lever or armature 32 having a dog or extension 33 adapted to engage core 21 and lock the same in any position it may happen to occupy whenever the armature is attracted by its core. The opposite end of conductor 27 is connected to contact block 26 of the meter and a conductor 27' connects contact arm 27' with main conductor 3.

A main switch 34 is connected with main circuit and is provided with a series coil 35 and the shunt coil 36 connected across the main circuit and operated in a manner well known in the art.

The operation of the apparatus disclosed in the drawing is as follows: The compression rheostat in the shunt field circuit is regulated by solenoid 13 to maintain constancy of generator voltage over a wide range of generator speed and a consequent gradually decreasing charging current as the battery voltage rises. When the battery reaches fully charged condition, as indicated by the ampere hour meter 24 it is desirable that the generator voltage be decreased so the battery floats across the generator circuit receiving no further charge, and in this manner avoiding any injurious overcharging. This is accomplished when the meter contact engages the contact block completing the circuit through coil of magnet 29 and shunting out a portion of the resistance 16, the amount shunted out being dependent upon the position of the arm at the time fully charged battery condition is reached. The effect of this is to allow more current to pass through solenoid coil 13 lowering the generator voltage until battery charging ceases. At the same time the locking dog 33 engages solenoid core 21 locking the contact arm in the position it then occupies, thus maintaining a voltage regulation at a lowered value as long as the battery remains in fully charged condition, this lowered value being about the same as the battery voltage at fully charged condition. The battery then floats idly across the line neither receiving any current from the generator nor delivering any to the lighting system, in case the latter happens to be connected in the circuit. This condition is maintained so long as the generator is driven at sufficiently high speed to keep the main line switch in closed position. In case the battery condition is abnormal at the time fully charged condition is reached, the subsequent standard of generator voltage regulation will be correspondingly varied through solenoid 22 and its resistance controlling arm 18 dependent upon the current flowing through solenoid coil 23 at the time the battery reaches fully charged condition. Take, for example, a case where the battery voltage is low at the end of a complete charge as where there is a reversed or dead cell. The charging current at that time will be abnormally high because the voltage of the battery itself is abnormally low. Due to this high current, solenoid core 21 will be attracted moving the swinging arm 18 over the contact points in position to cut out a relatively large portion of resistance when the crcuit is completed through the ampere hour meter. When the contact arm of the meter makes contact with its contact block 26 a circuit is completed through the solenoid coil 13 resistance 16 contact arm 18 solenoid coil 28 and meter contact arm 25. This allows an increased current to flow through the solenoid coil 13 increasing the resistance 8 in the field circuit of the generator, lowering the voltage to a point where the battery floats across the line without receiving charging current. No matter what is the condition of the battery at the end of a complete charge, it will thus be seen that the generator voltage will be adjusted to correspond thereto, and the danger of injurious overcharging will be avoided.

Having described my invention, what I claim as new and desire to secure by Letters Patent is:

1. In a car lighting system, in combination, an axle driven generator, a storage battery adapted to be charged thereby, regulating means for the generator including a voltage coil, and means operated only when and while the battery is fully charged to set said voltage coil to maintain a succeeding lower level of impressed voltage dependent on the battery condition under the preceding impressed voltage.

2. In a car lighting system, in combination, an axle driven generator, a storage battery adapted to be charged thereby, regulating means for the generator including a voltage coil, and means operative only when and while the battery is fully charged to set said voltage coil to maintain a succeeding lower level of impressed voltage dependent on the battery condition under preceding impressed voltage as reflected in the final charging current.

3. In a car lighting system, in combination, a variable speed generator, a storage battery connected to be charged thereby, voltage regulating means adapted to maintain constant voltage irrespective of generator speed, and means for adjusting the standard of said regulation dependent upon battery condition and operative only when said battery is in fully charged condition.

4. In a car lighting system, in combination, a variable speed generator, a storage battery connected to be charged thereby, voltage regulating means adapted to maintain constant voltage irrespective of generator speed, and means influenced by the final charging current for adjusting the standard of said regulation and operative only when said battery is in fully charged condition.

5. In a car lighting system, in combination, a variable speed generator, a storage battery connected to be charged thereby, voltage regulating means adapted to maintain constant voltage irrespective of generator speed, and means for adjusting the standard of said regulation dependent on battery condition as reflected in the charging current, and current responsive means rendering said second mentioned means effective only upon predetermined conditions.

6. In a battery charging system, in combination, a battery, a variable speed generator electrically connected to said battery, regulating means for maintaining constancy of generator voltage at varying speeds, and means operative only under predetermined conditions of battery charge and at varying degrees dependent upon battery condition for varying the standard of regulation for said regulating means.

7. In a battery charging system, in combination, a battery, a variable speed generator electrically connected to said battery, regulating means for maintaining constancy of generator voltage at varying speeds, and means operative only under predetermined conditions of battery charge and at varying degrees dependent upon battery condition as reflected in charging current for carrying the standard of regulation for said regulating means.

8. In a battery charging system, in combination, a battery, a variable speed generator electrically connected to said battery, regulating means for maintaining constancy of generator voltage at varying speeds, means operative only under predetermined conditions of battery charge and at varying degrees dependent upon battery condition for varying the standard of regulation for said regulating means, and for maintaing said new standard of regulation so long as said predetermined conditions of battery charge exist.

9. In a battery charging system, in combination, a battery, a variable speed generator electrically connected to said battery, regulating means for maintaining constancy of generator voltage at varying speeds, and means operative only at predetermined conditions of battery charge and at varying degrees dependent upon battery condition as reflected in charging current for varying the standard of regulation for said regulating means and for maintaining said new standard of regulation so long as said predetermined conditions of battery charge exist.

10. In a battery charging system, in combination, a battery, a variable speed generator electrically connected to said battery, regulating means for maintaining constancy of generator voltage at varying speeds, said means including an electro-responsive device, a circuit therefor, a resistance in said circuit, means operative only at predetermined condition of battery charge and responsive to battery condition for varying the effective resistance in said circuit to maintain a changed standard of regulation of said generator voltage, and means for maintaining the resistance in said circuit constant during said predetermined condition of battery charge.

11. In a battery charging system, in combination, a battery, a variable speed generator electrically connected to said battery, regulating means for maintaining constancy of generator voltage at varying speeds, said means including an electric-responsive device, a circuit therefore, a resistance in said circuit, a current responsive device for varying the effective resistance in said circuit to maintain a changed standard of voltage regulation of said generator, an electro-responsive locking device for said current responsive device, and a contact device rendering said current responsive device and said locking device operative upon predetermined conditions of battery charge.

In testimony whereof I affix my signature, in the presence of two witnesses.

LEONARD A. WATSON.

Witnesses:
J. THOMSON,
M. A. CASHIN.